INVENTOR
WILLIAM B. GOGARTY
BY Richard C. Gilbert Jr.

INVENTOR
WILLIAM B. GOGARTY
BY Richard C. Gilbert Jr.

United States Patent Office

Re. 27,198
Reissued Oct. 19, 1971

27,198

PROCESSES FOR THE SIMULTANEOUS DISPLACEMENT OF PETROLEUM AND WATER IN FORMATIONS

William B. Gogarty, Littleton, Colo., assignor to Marathon Oil Company, Findlay, Ohio Original No. 3,443,636, dated May 13, 1969, Ser. No. 665,845, Sept. 6, 1967. Application for reissue May 15, 1970, Ser. No. 37,497
Int. Cl. E21b *43/22, 47/00*
U.S. Cl. 166—252 15 Claims

Matter enclosed in heavy brackets [ ] appears in the original patent but forms no part of this reissue specification; matter printed in italics indicates the additions made by reissue.

ABSTRACT OF THE DISCLOSURE

The present invention comprises a process for the simultaneous displacement of petroleum and water in a formation by injecting thereinto a displacing fluid having a relative mobility [not greater than] *selected in accordance with* the minimum total relative mobility of the oil and water phases reasonably likely to be encountered in the formation under prevailing formation conditions. The total relative mobility corresponding to the water saturation caused by an appropriate slug of displacement fluid flowing in at least one rock sample reasonably representative of said formation is determined by flowing a representative slug of the actual displacement fluid to be used through said rock sample for a distance sufficient to achieve an equilibrium water saturation representative of the water saturation which will be caused by the slug flowing through the actual reservoir.

CROSS REFERENCES TO RELATED APPLICATIONS

The present invention is similar in purpose, but somewhat different in technique from S.N. 665,763, filed Sept. 6, 1967, *now U.S. Patent No. 3,443,635,* by William B. Gogarty and Harold P. Meabon and assigned to the assignee of the present invention.

BACKGROUND OF THE INVENTION

Field of the invention

The present invention relates to the field of miscible displacement of petroleum and water from formations. The invention has use in the secondary and also in the tertiary recovery of petroleum from formations. The invention is also useful in cases in which it is desirable to either speed primary production or to enhance a weak natural gas or water drive during primary production. The invention may also be utilized to displace fluids from around well bores, e.g. in modifying the injectivity characteristics of wells and in other well bore treating operations.

Description of the prior art

Various flooding methods for the displacement of petroleum in formations have been developed in the past. These include water floods in which water is injected into the formation to displace oil; thickened water floods in which polymers, e.g. certain polyacrylamides, carboxymethyl celluloses, etc. are used to decrease the mobility of the water and somewhat control the "fingering" generally encountered in ordinary water floods; alcohol floods; emulsion floods; e.g. U.S. 3,208,515 and U.S. 3,261,399; and the relatively new developed soluble oil types of flooding media and processes, e.g. U.S. 3,254,714 and 3,275,075.

As is well known, the total relative mobility of two phases (e.g. water and oil), $M_{o-w}$, flowing in porous petroleum bearing formations is related to both the viscosities of the fluids in place, and also to the characteristics of the individual formation in question, according to the following general formula:

$$M_{o-w}=\frac{k_{ro}}{\mu_o}+\frac{k_{rw}}{\mu_w}$$

where:

$k_{ro}$ is the relative permeability with respect to oil.
$k_{rw}$ is the relative permeability with respect to water.
$\mu_o$ is the viscosity of oil.
$\mu_w$ is the viscosity of water.

The relative permeabilities, $k_{ro}$ and $k_{rw}$ vary due to variations in water saturation, $S_w$, and rock characteristics from point to point in most reservoirs. Various calculation methods have been suggested for dealing with the individual mobilities of oil and water and their ratios, e.g. those for water flooding discussed in "Secondary Oil Recovery" by C. R. Smith, Chapter 7, pp. 183–235 (Reinhold, 1966). This same text also discusses various methods of miscible flooding and gives methods for the determination of performance of some such miscible floods, e.g. as at pages 357–358.

Most of these calculational methods have been useful for the prediction of recovery rather than for the optimizing of the displacing fluids. In practice, most past flooding operations have not involved simultaneous displacement of water and oil and have merely attempted to keep the viscosity of the flooding agent above that of the oil in place. To the best of our knowledge, no successful method of optimum slug design adaptable to a variety of reservoirs and to a variety of displacing fluids which are capable of simultaneous displacement of water and oil has previously been available.

SUMMARY OF THE INVENTION

The present invention affords new methods for the displacement of petroleum in formations which utilize displacement fluids specifically designed according to new techniques for the optimizing of the displacement fluids to obtain substantially maximum oil recovery without excessive fluid component or pumping costs due to unnecessarily high viscosities of the displacing fluids.

In preferred embodiments, the present invention simultaneously displaces both water and oil in the formation and maintains the total relative mobility of both of the displaced fluids greater than that of the displacing fluid so as to substantially avoid instability under the conditions which are reasonably likely to be encountered in the reservoir.

It is known that the water relative permeability, $k_{rw}$ and the oil relative permeability, $k_{ro}$ vary with water saturation $S_w$ in such a manner that as water saturation increases the relative permeability to water $k_{rw}$ increases while the relative permeability to oil $k_{ro}$ decreases (see, for example, FIGURES 1 to 4). Since the viscosities of the oil and water $\mu_o$ and $\mu_w$, respectively are relatively constant within the reservoir, the total relative oil and water mobility, $M_{o-w}$, in relation to water saturation, reaches a minimum point. That is, starting at a low value of water saturation $S_w$, $M_{o-w}$ will first decrease as $S_w$ increases, and then reach a minimum point and thereafter increase as $S_w$ increases (see, for example FIGURE 5). The present invention therefore utilizes, in certain of its preferred embodiments, the finding that in the simultaneous displacement of petroleum and water in a reservoir by an appropriate slug of displacement fluid there exists ahead of the slug a certain total relative oil and water mobility, $M_{o-w}$. By determining this value of total relative mobility for ach of a number of rock samples taken from different oints in a reservoir, then selecting the lowest of these alues, a minimum total relative oil and water mobility $M_{o-w}$ may be found for any given entire reservoir or por- ion of a reservoir. It is most important to the present in- ention that this minimum value to be encountered in the eservoir may be determined without knowing the water aturation at various points within the reservoir. Water aturation at points ahead of the displacing fluid in the eservoir is affected by the displacement process and is, t best, extremely difficult to estimate prior to the initia- ion of flooding.

Of course, the minimum total relative oil and water nobility $M_{o-w}$ reasonably likely to be encountered in the eservoir may be determined from the total relative mobil- ty measured ahead of the displacement slug in the vari- us rock samples by the application of statistical sampling echniques so that the minimum may be selected with arious degrees of confidence. Where the taking and test- ng of a large number of rock samples indicates that the eservoir is relatively homogeneous and that the samples nay be taken as representative of the reservoir as a whole, he minimum total relative oil and water mobility as de- ermined from the lowest sample tested may be taken as he minimum for the entire reservoir. Alternatively, it nay be found on the basis of experience in particular res- rvoirs, that the assigning of a factor, e.g. 90% of the owest total relative oil and water mobility encountered in ny sample of a set of samples, provides a mobility hav- ng a high degree of confidence that it will not be sub- eeded at any point in the reservoir. Such experience may ermit finding the minimum $M_{o-w}$ for an entire typical eservoir on the basis of even a simple representative rock ample.

Regardless of the method used for determining, with a lesired degree of certainty, the minimum total relative il and water mobility to be encountered within the res- rvoir, the present invention permits such determination o be made purely from rock and oil and water samples vithout knowledge of the water saturation at various points within the reservoir during flooding. The present invention hen utilizes this minimum total relative oil and water nobility, $M_{o-w}$, as the criteria for the selection or design- ng of the displacement fluid. Knowing the minimum $M_{o-w}$ to be encountered, and having rock specimens at and, a displacing fluid, e.g. an alcohol, ketone, aldehyde, oluble, oil, or other displacing fluid can be selected to have mobility less than said minimum total relative mobility o be encountered in the fluids being simultaneously dis- laced and therefore instabilities can be substantially voided.

The techniques of the present invention are particular- y important with the new micellar and other multi-com- onent displacement fluids which permit careful tailoring f the mobility of the fluid to virtually any desired value. n most such composite fluids there will be a number of ormulations which will meet the requirement of not ex- eeding the total relative oil and water mobility. From hese can then be selected the most economic fluid with espect to the cost of its ingredients and the cost of inject- ng the fluid and moving it through the reservoir. This economic optimization may be readily conventionally ac- omplished based on the well spacing, formation thick- ness, oil in place and other factors to be encountered in he reservoir.

Where relatively expensive high efficiency displacement luids are being utilized, e.g., soluble oils, it will generally e desirable to drive a bank or slug of such displacement naterials with a secondary fluid or fluids, e.g. water or vater separated from the slug by a mobility buffer, e.g. hickened water or water external emulsion. Since finger- ng of such secondary fluids through the first bank of high efficiency displacement fluids would seriously detract from he efficiency of the total flooding operation, it is especial- y desirable that the mobilities of such buffer fluids be maintained below the mobilities of the displacement fluids which they drive. In short, according to the present inven- tion, any number of fluid banks may be injected sequential- ly, each driving against the one previously injected; so that each (excluding the drive water which is injected last) can have a lower mobility than does the fluid which it drives. The mobilities will preferably be measured at substantially the worst (highest) frontal velocities to be utilized during the injection and recovery process.

Frontal velocities which will be encountered only in relatively small areas of the formation, e.g. near the well bore can be disregarded where warranted by engineering judgment.

Though not absolutely necessary this designing can preferably be accomplished by simply plotting the mobili- ties of the various displacement banks (as the ordinate) versus the frontal velocities in the range anticipated (as the abscissa) and drawing the minimum total relative oil and water mobility $M_{o-w}$ determined as discussed above, as a straight line parallel to the abcissa (see, for example, FIGURE 6). The various displacement fluids and mobility buffers are then designed to each have a mobility at each frontal velocity which is less than that of the mobility of the preceding fluid at that frontal velocity.

All of the above discussions are based on removal of rock samples from the formation and laboratory deter- mination of the total relative oil and water mobility by testing such samples. It is an important advantage that the present invention is applicable to both secondary and tertiary operations and eliminates the need for either the determination of the oil and water relative permeability of rock samples from the formation or transient testing of the reservoir itself.

The determination of the total relative oil and water mobility takes place in a core sample previously saturated with oil and water. A slug of displacement fluid having the approximate composition to be used in the actual recovery operation is injected into the core and causes the displace- ment of the oil and water in such a manner as to establish a stabilized bank of oil and water. By using the known flow rate, specific core permeability and cross-sectional area of the core and measuring the pressure drop across a known length of core as the stabilized bank passes, the total relative mobility of oil and water bank can be calcu- lated.

DESCRIPTION OF THE PREFERRED EMBODIMENTS

Figure 1:
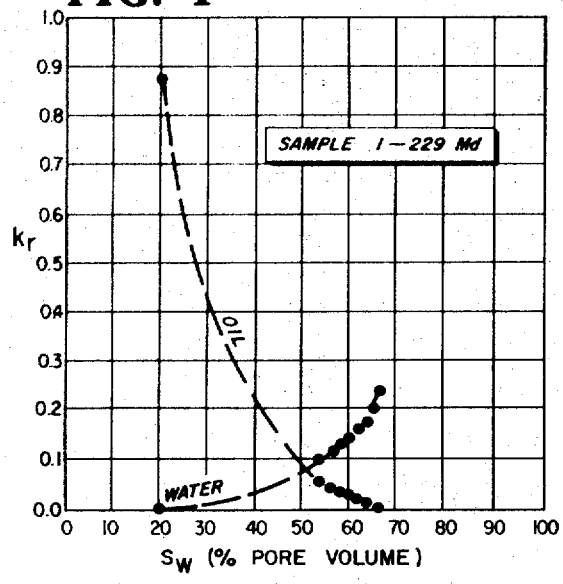
FIGURES 1 through 4 show plots of relative perme- ability, $k_r$ versus water saturation $S_w$, with oil and water permeabilities plotted separately on each graph, and with each graph representing a different rock sample obtained from a single reservoir.
Figure 2:
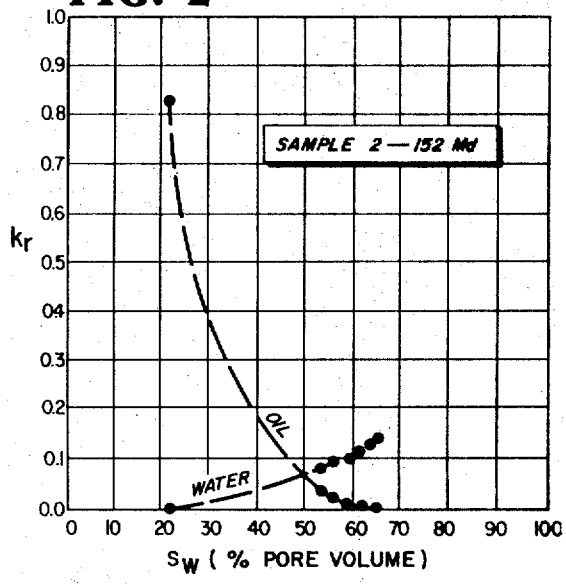
Figure 3:
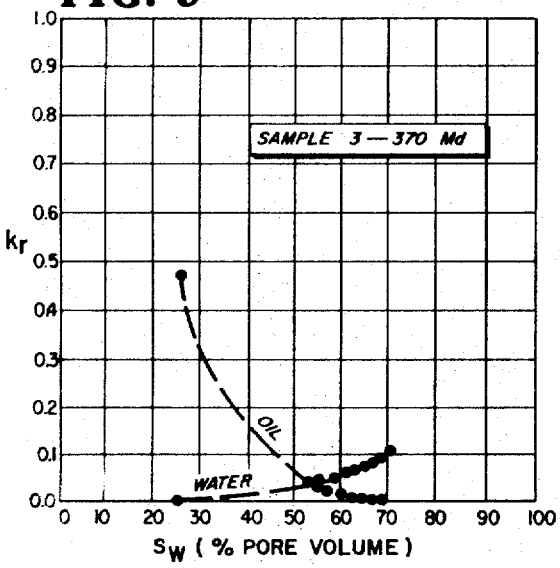
Figure 4:
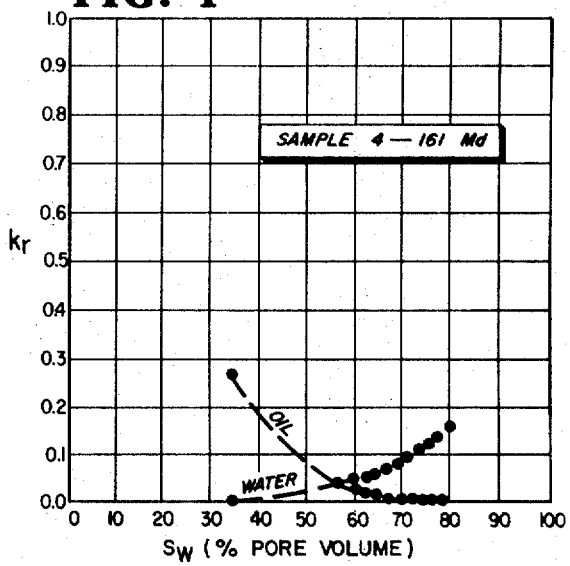
Figure 5:
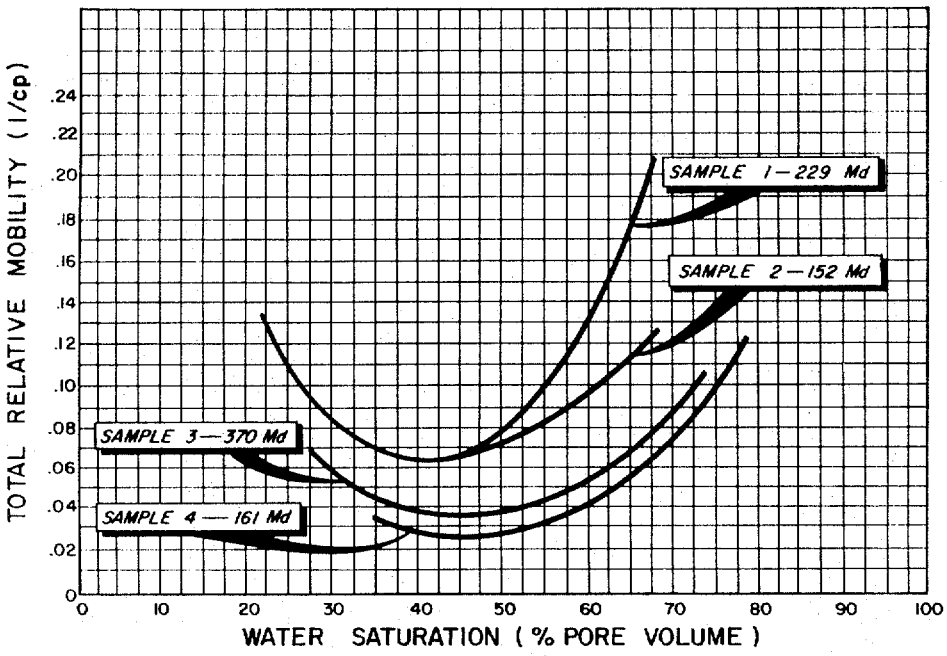
FIGURE 5 is a graph of total relative mobility $M_{o-w}$ (expressed in reciprocal centipoises) versus water satura- tion, $S_w$, with a separate curve for each of the rock sam- ples utilized in FIGURES 1 through 4, somewhat extrap- olated.

The method of determining the minimum total relative mobility is based on laboratory flooding results using a dis- placement fluid having the approximate composition to be used in the actual recovery operation in the field. For these floods, reservoir core samples are saturated with actual reservoir fluids. Cores must be long enough to allow development of the stabilized oil and water bank ahead of the displacement fluid. In practice, one-inch diameter core with a length of from 3 up to 12 inches normally are suit- able. Saturations in the stabilized bank are independent of the original oil and water saturations before displacement. For this reason cores can either be saturated with water and flooded with oil to residual water or saturated with water, flooded with oil, and waterflooded to residual oil. Generally, the situation of residual oil is preferred because relative permeability values at both residual water and oil can be obtained and compared to any available relative permeability data, thus indicating that a representative reservoir core is being used.

The differential pressure is measured across a portion of the core near the downstream end. This pressure drop measurement is made during the time that the stabilized bank flows past this portion of the core. From the pressure measurements, rock parameters and known flow rate, the total relative mobility, $M_{o-w}$, of the stabilized bank is determined by:

$$M_{o-w}=\frac{qL}{kA\Delta p}$$

where:

q=the flow rate
L=the portion of the core over which the pressure drop is measured
k=specific permeability
A=cross-sectional area of the core
$\Delta p$=pressure drop across the length, L Results calculated using the above equation are shown in Table I. The displacement experiments from which the mobilities of Table I were calculated were performed on different rock samples from the same reservoir.

TABLE I

Total relative mobilities from displacement experiments

| Samples: | Mobility (l./centipoise) |
|---|---|
| 1 | 0.073 |
| 2 | 0.029 |
| 3 | 0.061 |
| 4 | 0.035 |
| 5 | 0.049 |

These mobilities are illustrative of the rock properties of a reservoir which has undergone secondary recovery. The next step is to choose the minimum value of $M_{o-w}$ likely to be encountered in the reservoir. While conventional statistical sampling techniques may be utilized as mentioned above, to determine this minimum value to any desired degree of certainty, in this exemplary situation, the rock samples are assumed to be representative of the formation and the minimum mobility encountered in the samples taken as a group is reasonably certain to be the minimum mobility to be encountered in the reservoir. As seen in Table I the minimum total relative mobility for the five samples is 0.029.

The next step is the design of a displacement fluid which has a mobility lower than the 0.029 minimum total relative mobility determined above in order to assure substantial freedom from instability in the flooding operation. In the present embodiment a slug of soluble oil is to be followed by a mobility buffer fluid consisting of water thickened with certain partially hydrolyzed polyacrylamides of the sort marketed by the Dow Chemical Company under the designation "Dow Pusher" and frequently used in conventional thickened water flooding operations. The mobility of the soluble oil displacement fluid is adjusted by varying the composition of the soluble oil by trial and error and repeatedly determining its mobility in a rock sample, preferably in the sample in which the minimum $M_{o-w}$ was previously determined. Where the affect of the various ingredients on the mobility of the soluble oil has been previously studied, empirical charts may be readily constructed to assist in the design of the soluble oil. Where a variety of soluble oil compositions will all meet the requirement of mobility less than the above determined total relative water and oil minimum mobility, economic considerations will generally determine the particular composition to be chosen.

Figure 6:
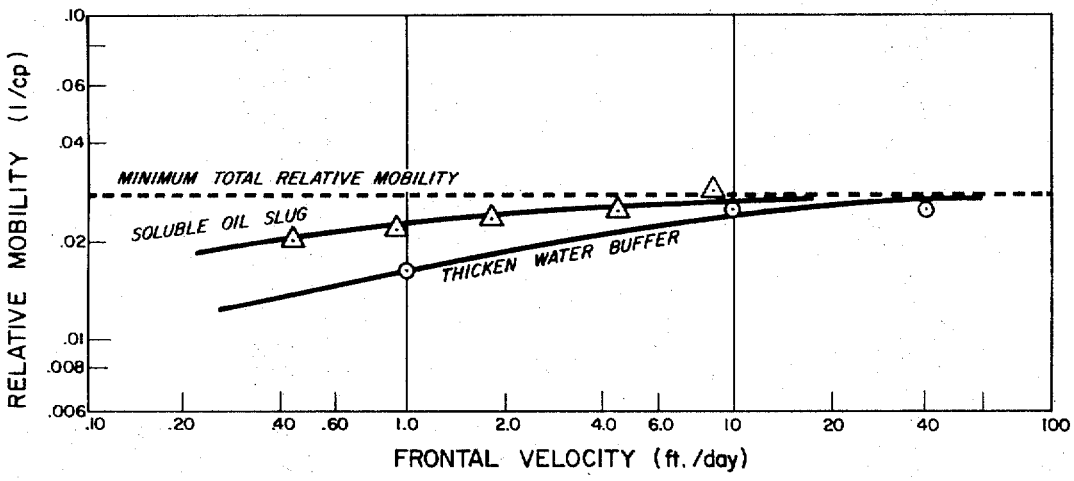
FIGURE 6 is a plot of relative mobility (in reciprocal centipoises) versus frontal velocity (in feet/day) for each of the following: oil and water; and exemplary soluble oil slug; and an exemplary thickened water buffer which con- tacts the soluble oil slug.

As shown in FIGURE 6, the mobility of the soluble oil bank is determined at each of the frontal velocities to be encountered in the actual flooding operation. The soluble oil of the present embodiment has a composition by volume as follows:

| | Percent |
|---|---|
| Petroleum sulfonate | 10.3 |
| Isopropyl alcohol | 0.4 |
| Crude column overhead hydrocarbons | 57.2 |
| Water | 32.1 |

As can be seen from FIGURE 6, the soluble oil is chosen because the mobilities on the soluble oil mobility curve are in all cases, less than the straight line horizontal and parallel to the frontal velocity abcissa which represents the total relative oil and water minimum mobility as determined above. It is permissible that the soluble oil mobility curve eventually rise above the minimum $M_{o-w}$ curve so long as the point of intersection is outside of the range of frontal velocities to be encountered in the formation.

Similarly, the thickened water is adjusted to a composition of approximately 2400 parts per million by weight polyacrylamide yielding the lower curve shown in FIGURE 6. This curve is also proper inasmuch as it is at all points below the mobility curve for the soluble oil displacing fluid which will precede the thickened water. If more than a two bank displacement fluid system is desired, additional banks may be designed, each having a mobility curve lower than the fluid previously injected at each frontal velocity to be encountered in the operation, and these can then be followed by drive water.

The soluble oil material is then injected into an injection well located in the formation from which the rock samples were taken. The quantity of soluble oil injected will generally be based on the distance which the soluble oil slug or bank is expected to displace the petroleum. Conventional techniques of slug sizing, well spacing, and line drive techniques can be employed with the present invention. In most cases, petroleum in place will be displaced toward, and eventually withdrawn from a production well located within the formation.

The injection itself is done according to established principles of petroleum well bore treatment and recovery, with care being taken to maintain the frontal velocities of the fluids at rates in the range of those utilized in the preceding steps.

The present invention should not be limited to the above illustrative examples and the claims should be considered as including all of the wide variety of modifications and variations which will be made obvious to those skilled in the art upon a reading of the specification.

For example, fluids for use with the present invention may be thickened by any of the many known viscosity control agents, including without limitation, partially hydrolyzed polyacrylamides, sugar, glycerine, starches, and carboxymethyl cellulose, so long as these are selected in accordance with the characteristics of the particular reservoir.

What is claimed is:

1. A process for the simultaneous displacement of petroleum and water in formations bearing petroleum and water and having at least one injection means in said formation, comprising in combination the steps of:

(a) determining the total relative mobility of water and oil corresponding to the water saturation caused by an appropriate slug of displacement fluid flowing in at least one rock sample reasonably representative of the structure of the reservoir, said corresponding total relative mobility being determined by flowing a slug of the approximate composition to be used in the actual displacement operation through said rock sample for a distance sufficient to achieve an equilibrium water saturation representative of the water saturation which will be caused by the slug flowing through the actual reservoir, (b) determining from the total relative mobilities of said sample or samples the minimum total relative mobility reasonably likely to be encountered in the formation, (c) preparing a displacing fluid having relative mobility not greater than said minimum total relative mobility under the conditions prevailing in the formation, (d) injecting said displacement fluid into said at least one injection means so as to simultaneously displace water and petroleum present in the formation, said injection being controlled at such rates as to maintain the relative mobility of said displacement fluid below said minimum total relative mobility at substantially all points within said formation.

2. The process of claim 1 wherein said displacement luid comprises a slug of soluble oil.

3. The process of claim 2 wherein the displacement luid comprises a slug of soluble oil, followed by a sec-ond fluid.

4. The process of claim 2 wherein a mobility buffer luid is injected after said displacer fluid, and wherein aid mobility buffer fluid has a lower mobility than said lisplacement fluid, said mobility being measured at the velocities to be encountered during the displacement rocess.

5. The process of claim 4 wherein the mobility buffer omprises a water-external emulsion.

6. The process of claim 3 in which the second fluid ontains a major portion of water.

7. The process of claim 6 in which the water of the econd fluid is thickened by the addition of a thickening gent.

8. The process of claim 7 wherein the thickening agent s selected from the group consisting of partially hydroyzed polyacrylamide, suar, glycerin, starches, carboxynethyl cellulose.

9. The process of claim 3 wherein the petroleum and vater are displaced toward a producing well in said fornation.

10. The process of claim 1 wherein the petroleum and vater are displaced toward a producing well in said fornation.

11. The process of claim 1 wherein a mobility buffer luid is injected after said displacer fluid, and wherein aid mobility buffer fluid has a lower mobility than said lisplacement fluid, said mobility being measured at the velocities to be encountered during the displacement rocess.

12. The process of claim 11 wherein the mobility uffer comprises a water-external emulsion.

*13. A process for the simultaneous displacement of etroleum and water in formations bearing petroleum*

*and water and having at least one injection means in said formation, comprising in combination the steps of:*

*(a) determining the total relative mobility of water and oil corresponding to the water saturation caused by an appropriate slug of displacement fluid flowing in at least one rock sample reasonably representative of the structure of the reservoir, said corresponding total relative mobility being determined by flowing a slug of the approximate composition to be used in the actual displacement operation through said rock sample for a distance sufficient to achieve an equilibrium water saturation representative of the water saturation which will be caused by the slug flowing through the actual reservoir,*

*(b) determining from the total relative mobilities of said sample or samples the minimum total relative mobility reasonably likely to be encountered in the formation,*

*(c) preparing a displacing fluid having a relative mobility selected in accordance with said minimum total relative mobility to control fingering of said displacing fluid through the fluid to be displaced under the conditions prevailing in the formation,*

*(d) injecting said displacing fluid into at least one injection means so as to displace fluid in the formation.*

*14. The process of claim 13 wherein said displacement fluid comprises a slug of soluble oil.*

*15. The process of claim 13 wherein a mobility buffer fluid is injected after said displacer fluid, and wherein said mobility buffer fluid has a lower mobility than said displacement fluid, said mobility being measured at the velocities to be encountered during the displacement process.*

References Cited

The following references, cited by the Examiner, are of record in the patented file of this patent or the original patent.

UNITED STATES PATENTS

| | | | |
|---|---|---|---|
| 3,003,554 | 10/1961 | Craig et al. | 166—274 |
| 3,006,411 | 10/1961 | Holbrook | 166—273 |
| 3,044,544 | 7/1962 | Holbrook et al. | 166—273 |
| 3,148,730 | 9/1964 | Holbert | 166—274 |
| 3,208,517 | 9/1965 | Binder et al. | 166—274 |
| 3,221,810 | 12/1965 | Marx | 166—269 |
| 3,254,714 | 6/1966 | Gogarty et al. | 166—274 |
| 3,261,399 | 7/1966 | Coppel | 166—273 |
| 3,275,075 | 9/1966 | Gogarty et al. | 166—274 |
| 3,352,358 | 11/1967 | Williams | 166—273 |
| 3,362,473 | 1/1968 | Foster | 166—273 |

STEPHEN J. NOVOSAD, Primary Examiner

U.S. Cl. X.R.

166—273